US008428301B2

(12) United States Patent  
Radhakrishnan et al.

(10) Patent No.: US 8,428,301 B2  
(45) Date of Patent: Apr. 23, 2013

(54) CONTENT IDENTIFICATION AND QUALITY MONITORING (75) Inventors: Regunathan Radhakrishnan, San Bruno, CA (US); Jeffrey Riedmiller, Penngrove, CA (US); Claus Bauer, Beijing (CN); Wenyu Jiang, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 87 days.

(21) Appl. No.: 13/059,839

(22) PCT Filed: Aug. 21, 2009

(86) PCT No.: PCT/US2009/054568  
§ 371 (c)(1),  
(2), (4) Date: Feb. 18, 2011

(87) PCT Pub. No.: WO2010/022303  
PCT Pub. Date: Feb. 25, 2010

(65) Prior Publication Data  
US 2011/0188704 A1    Aug. 4, 2011

Related U.S. Application Data (60) Provisional application No. 61/091,326, filed on Aug. 22, 2008.

(51) Int. Cl.  
*G06K 9/00* (2006.01)  
*B42D 15/00* (2006.01)

(52) U.S. Cl.  
USPC .................................... 382/100; 283/68

(58) Field of Classification Search .................. 382/100, 382/115, 116, 124; 348/180, 192; 380/252; 345/501, 547, 530, 531; 704/236, 270, 276; 725/22, 47; 283/68, 78; 713/186  
See application file for complete search history.

(56) References Cited

U.S. PATENT DOCUMENTS 5,596,364 A * 1/1997 Wolf et al. ..................... 348/192  
6,574,594 B2 * 6/2003 Pitman et al. .................. 704/236  
(Continued)

FOREIGN PATENT DOCUMENTS

EP       0757499       2/1997  
EP       0986269       3/2000  
(Continued)

OTHER PUBLICATIONS

Liu, et al., "A Security Video Watermarking Scheme for Broadcast Monitoring" Proceedings of 2007 3rd International Workshop on Signal Design and its Applications in Communications, pp. 109-113.

(Continued)

*Primary Examiner* — Abolfazl Tabatabai (57) ABSTRACT

Content identification and quality monitoring are provided. The method involves obtaining a first fingerprint derived from a first media content, processing the first media content to generate a second media content, obtaining a second fingerprint derived from the second media content, and comparing the first fingerprint and the second fingerprint to determine one or more of: a similarity between the first fingerprint and the second fingerprint that indicates that the second media content is generated from the first media content or a difference between the first fingerprint and the second fingerprint to identify a quality degradation between the first media content and the second media content.

26 Claims, 4 Drawing Sheets

U.S. PATENT DOCUMENTS

| | | | |
|---|---|---|---|
| 6,829,368 B2 * | 12/2004 | Meyer et al. | 382/100 |
| 7,181,022 B2 * | 2/2007 | Rhoads | 381/73.1 |
| 8,027,565 B2 * | 9/2011 | Zhang | 386/241 |
| 2003/0112249 A1 | 6/2003 | Cheng | |
| 2003/0112996 A1 | 6/2003 | Holliman | |
| 2004/0009763 A1 | 1/2004 | Stone | |
| 2004/0025176 A1 | 2/2004 | Franklin | |
| 2004/0143349 A1 | 7/2004 | Roberts | |
| 2004/0189873 A1 | 9/2004 | Konig | |
| 2005/0144455 A1 | 6/2005 | Haitsma | |
| 2005/0149968 A1 | 7/2005 | Konig | |
| 2005/0172312 A1 | 8/2005 | Lienhart | |
| 2005/0193016 A1 | 9/2005 | Seet | |
| 2006/0026413 A1 | 2/2006 | Ramkumar | |
| 2006/0153296 A1 | 7/2006 | Deng | |
| 2006/0187358 A1 | 8/2006 | Lienhart | |
| 2006/0190776 A1 | 8/2006 | Oostveen | |
| 2006/0195860 A1 | 8/2006 | Eldering | |
| 2006/0259783 A1 | 11/2006 | Work | |
| 2007/0011699 A1 | 1/2007 | Kopra | |
| 2007/0112775 A1 * | 5/2007 | Ackerman | 707/9 |
| 2007/0250856 A1 | 10/2007 | Leavens | |
| 2008/0002854 A1 | 1/2008 | Tehranchi | |
| 2008/0192119 A1 | 8/2008 | Li | |
| 2009/0063277 A1 | 3/2009 | Bernosky | |
| 2010/0238350 A1 | 9/2010 | Radhakrishnan | |
| 2011/0022633 A1 | 1/2011 | Bernosky | |
| 2011/0035382 A1 | 2/2011 | Bauer | |

FOREIGN PATENT DOCUMENTS

| | | |
|---|---|---|
| EP | 1457889 | 9/2004 |
| EP | 1653381 | 5/2006 |
| WO | 9322875 | 11/1993 |
| WO | 9517054 | 6/1995 |
| WO | 9820675 | 5/1998 |
| WO | 2005006768 | 1/2005 |
| WO | 2005111998 | 11/2005 |
| WO | 2005114450 | 12/2005 |
| WO | 2006018790 | 2/2006 |
| WO | 2006055971 | 5/2006 |
| WO | 2007053112 | 5/2007 |
| WO | 2007130389 | 11/2007 |
| WO | 2007148290 | 12/2007 |
| WO | 2009/046438 | 4/2009 |

OTHER PUBLICATIONS

Coskun, et al., "Spatio-Temporal Transform Based Video Hashing" IEEE Transactions on Multimedia vol. 8 No. 6, Dec. 2006 pp. 1190-1208.

Herley, Cormac, "Accurate Repeat Finding and Object Skipping Using Fingerprints" published 2005, The Institution of Engineering and Technology, pp. 1-10.

Zhao, et al., "Bandwidth Efficient Fingerprint Multicast for Video Streaming" Proc. IEEE International Conference on Acoustics, Speech and Signal Processing, Published 2004, pp. 849-852.

Caspi, et al., "Sharing Video Annotations" 2004 International Conference on Image Processing (ICIP) pp. 2227-2230.

Hellmuth, et al., "Using MPEG-7 Audio Fingerprinting in Real-World Applications" presented at the 115th convention Oct. 10-13, 2003, New York USA, pp. 1-10.

Lee, et al., "A TV Commercial Monitoring System Using Audio Fingerprinting" 6th International Conference of Entertainment Computing, ICEC 2007 published on 2007.

Kasutani, et al., "Linking TV Programs with Internet Contents Based on Video Fingerprinting" published on 2006, The Institution of Engineering and Technology pp. 203-204.

Jang, et al., "Automatic Commercial Monitoring for TV Broadcasting Using Audio Fingerprinting" 29th International Conference: Audio for Mobile and Handheld Devices, 2006 pp. 1-6.

Oostveen, et al., "Feature Extraction and a Database Strategy for Video Fingerprinting" published in 2002, Institution of Electrical Engineers.

Ng, et al., "Wavelet Domain Watermarking Using Maximum Likelihood Detection" published in The Journal of Imaging Science and Technology, May/Jun. 2005, vol. 49, No. 3, pp. 302-307.

Lebosse, et al., "A Robust Audio Fingerprint Extraction Algorithm" Publication date: 2007, The Institution of Engineering and Technology.

Herkiloglu, et al., "Music Genre Determination Using Audio Fingerprinting" 2006 IEEE 14th Signal Processing and Communications Applications, Published 2006.

Comes, et al., "Audio Watermarking and Fingerprinting: for Which Applications?" Publication date: Mar. 2003, IEEE Institution of Electrical Engineers.

Doets, et al., "On the Comparison of Audio Fingerprints for Extracting Quality Parameters of Compressed Audio" Security, Steganography and Watermarking of Multimedia Contents published on 2006.

Takahashi, et al., "Content Fingerprinting for Multicast Networks" International Conference on Software, Telecommunications and Computer Oct. 8-11, 2002.

Herley, Cormac "ARGOS: Automatically Extracting Repeating Objects from Multimedia Streams" IEEE Transactions on Multimedia to Appear pp. 1-29.

Batlle, et al., "Recognition and Analysis of Audio for Copyright Protection: The RAA Project" published in 2004, Institution of Electrical Engineers.

Cano, et al., "Robust Sound Modeling for Song Identification in Broadcast Audio" presented at 112th Convention, May 10-13, 2002, Munich Germany, pp. 1-7.

Sonoda, et al., "A Study of Fingerprinting for Broadcasting of Music Signals" Institution of Electrical Engineers, publication date: Feb. 2006.

* cited by examiner

CONTENT IDENTIFICATION AND QUALITY MONITORING

CROSS-REFERENCE TO RELATED APPLICATIONS

This application claims priority to U.S. Patent Provisional Application No. 61/091,326, filed 22 Aug. 2008, hereby incorporated by reference in its entirety.

TECHNOLOGY

The present invention relates generally to content identification and quality monitoring. More specifically, embodiments of the present invention relate to content identification and quality control based on media content fingerprints.

BACKGROUND

Media content corresponds to still images, segments of audio media, video media, or audio/visual (AV) media and include information that is embodied, stored, transmitted, received, processed, or otherwise used with at least one medium. Common media content formats include FLV format (flash video), Windows Media Video, RealMedia, Quicktime, MPEG, MP3, DivX, JPEGs, and Bitmaps. As used herein, the terms "media clips", "media content," "information content," and "content" may be used interchangeably.

Media content is produced, processed, and transmitted to consumers. However, subsequent to production, the processing, and/or transmitting may result in quality degradation of the media content. Accordingly, broadcasters today are continuously challenged with balancing the number of human operators against the number of artificial processes utilized for Quality Control (QC) as well as the continuous monitoring of media content as the media content is being broadcast to consumers. This challenge is due to the fact that many networks and operators today are also consolidating their operations as well as expanding their programming availability across a diverse range of mediums while controlling their costs to do so. Many broadcasters have come to rely on some type of process (or processes) to ensure that content meets their own (often subjective) criteria both before being aired (e.g., during QC) and while being aired. The processes generally include QC checks at many different steps along the chain from production to broadcasting and may involve a human operator verifying the quality at each of the steps.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

The example embodiments described herein relate to fingerprint based quality control for media content. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Example embodiments are described herein according to the following outline:

1.0 General Overview
    2.0 Architectural and Functional Overview
    3.0 Example Flow Diagram
    4.0 Example System Diagram
    5.0 Implementation Mechanisms—Hardware Overview
    6.0 Equivalents, Extensions, Alternatives, and Miscellaneous

1.0 General Overview

In a possible embodiment, a first fingerprint is derived from a first media content. The first media content is processed to generate a second media content and a second fingerprint is derived from the second media content. The first fingerprint and the second fingerprint are then compared to determine one or more of: a similarity between the first fingerprint and the second fingerprint that indicates that the second media content is generated from the first media content, or a difference between the first fingerprint and the second fingerprint to identify a quality degradation between the first media content and the second media content.

The quality degradation between the first media content and the second media content may be proportional to a number of differing bits between the first fingerprint and the second fingerprint. Further, the processing of the first media content may be modified to reduce the quality degradation from the first media content to the second media content. The modification may be based on whether a quality degradation threshold is met. The quality degradation threshold may be based on a hamming distance from the first fingerprint to the second fingerprint, a signal to noise ratio (SNR), a peak signal to noise ratio (PSNR), a perceptual evaluation of video quality (PEVQ), a structural similarity (SSIM) between the first media content and the second media content, a universal quality index (UQI), a video quality metric (VQM), an audio frequency response, a total harmonic distortion (THD), a channel separation, a stereo phase correlation, an effective rms power, a loudness, a weighted power, a sample magnitude, a true-peak, a sample bit-depth, a sample endianness, or an audio data burst spacing.

In a possible embodiment, processing the first media content to generate the second media content comprises applying a plurality of processing modules to the first media content. A processing module of the plurality of processing modules that caused the quality degradation from the first media content to the second media content may be identified. Thereafter the identified processing module that caused the quality degradation from the first media content to the second media content may be removed, replaced, or corrected to reduce the quality degradation.

The quality degradation may include one or more of: at least a portion of the first media content missing in the second media content, a media channel reordering, a media content sequence reordering, or a difference between a relative alignment of components in the first media content and relative alignment of corresponding components in the second media content. Further, the difference between a relative alignment of components in the first media content and relative alignment of corresponding components in the second media content results in a difference in the spatial effect created with a plurality of channels in the first media content and a spatial effect created with a corresponding plurality of channels in the second media content.

A quality of the first media content may be verified prior to derivation of the first fingerprint from the first media content. An airtime associated with a broadcast of the second media content may be verified based on the second fingerprint derived from the second media content.

In a possible embodiment obtaining the first fingerprint derived from the first media content comprises: obtaining a first audio fingerprint from an audio portion of the first media content and a first video fingerprint from a corresponding video portion of the first media content in parallel prior to processing the first media content, determining an alignment of the audio portion of the first media content relative to the video portion of the first media content, obtaining a second audio fingerprint from an audio portion of the second media content and a second video fingerprint from a corresponding video portion of the first media content in parallel subsequent to processing the first media content, and verifying an alignment of the audio portion of the second media content relative to the video portion of the second media content based on the alignment of the audio portion of the first media content relative to the video portion of the second media content.

Other embodiments of the invention may include a system and computer readable medium with functionality to execute the steps described above.

2.0 Architectural and Functional Overview

Examples of possible embodiments, which relate to quality control for media content, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Figure 1:
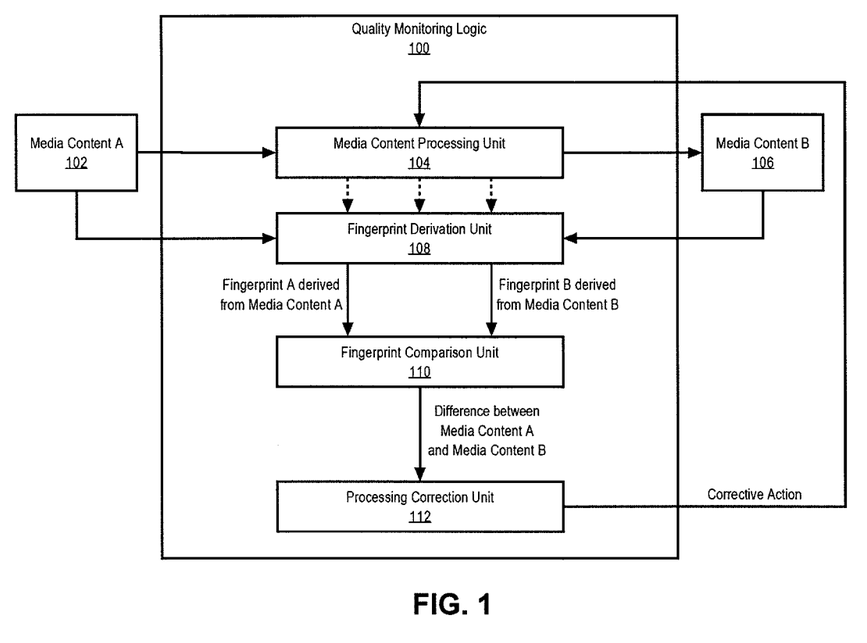
FIG. 1 depicts an example of a quality monitoring logic, according to an embodiment of the present invention.

FIG. 1 illustrates an example of a quality monitoring logic 100 in accordance with an embodiment. In an embodiment, the quality monitoring logic 100 comprises a media processing unit 104, a fingerprint derivation unit 108, a fingerprint comparison unit 110, a processing correction unit 112. The quality monitoring logic 100 may also include a broadcasting unit used for transmitting media content.

Each of these components is described below and may be located on the same device (e.g., a server, mainframe, desktop PC, laptop, PDA, television, cable box, satellite box, kiosk, telephone, mobile phone, etc.) or may be located on separate devices coupled by a network (e.g., Internet, Intranet, Extranet, Local Area Network (LAN), Wide Area Network (WAN), etc.), with wire and/or wireless segments. In one or more embodiments of the invention, the quality monitoring logic 100 is implemented using a client-server topology. The quality monitoring logic 100 itself may be an enterprise application running on one or more servers, and in some embodiments could be a peer-to-peer system, or resident upon a single computing system. In addition, the quality monitoring logic 100 is accessible from other machines using one or more interfaces, web portals, or any other tool to access the quality monitoring logic 100. In one or more embodiments, the quality monitoring logic 100 is accessible over a network connection, such as the Internet, by one or more users. Information and/or services provided by the quality monitoring logic 100 may also be stored and accessed over the network connection.

Media content (e.g., media content A 102 and media content B 106) may be described herein with reference to one or more example media, including still images, video, and/or audio media. The selection of example mediums in this description may be made for simplicity and concise unity and, unless expressly stated to the contrary, should not be construed as limiting an embodiment to a particular medium as embodiments of the present invention are well suited to function with either still images, audio media, or video media. Furthermore, embodiments of the present invention are well suited to function with images corresponding to audio and/or video media, which may represent two or three spatial dimensions.

In a possible embodiment, the media content processing unit 104 corresponds to software and/or hardware used for processing media content that receives media content A 102 as input and provides media content B 106 as output. The media content processing unit 104 may refer to a single processing module or a group of processing modules that are applied to media content A 102. Examples of processing modules for audio content may include modules directed to surround encoding, equalization, off-speed play, dynamics processing, gain changes, channel swapping, delay, etc. Examples of processing modules for video content may include modules directed to transcoding, addition of graphics and overlays, de-noising etc.

In a possible embodiment, the fingerprint derivation unit 108 corresponds to software and/or hardware used for deriving (e.g., extracting, generating, determining, computing, etc.) a media fingerprint ("fingerprint" used interchangeably with and equivalent to "signature") from media content. Some fingerprints of media content may be derived from information within, or which comprises a part of the media content. A media fingerprint embodies or captures an essence of the media content of the corresponding media and may be uniquely identified therewith. Video fingerprints may be derived from images or frames of a video clip. Audio fingerprints may be derived from images with embedded audio information (e.g., spectrograms). The fingerprint derivation unit 108 may also be configured to derive fingerprints from media content using any other methods known in the art. Further, the term media fingerprint may refer to a low bit rate representation of the media content with which the media fingerprints are associated and from which the media fingerprints are derived. The fingerprint derivation unit 108 may be configured to derive a fingerprint from media content A 102 or media content B 106. Further, the fingerprint derivation unit 108 may also be configured to derive a fingerprint at any point during the processing of media content A 102 (e.g., any time along a processing chain from media content A 102 to media content B 106). The fingerprint derivation unit 108 may also be configured to derive multiple fingerprints from selected media content. For example, the fingerprint derivation unit 108 may be configured to use different fingerprint derivation techniques to derive multiple fingerprints from the same media content (e.g., fingerprint derivation techniques with varying levels of robustness or sensitivity to changes). Furthermore, the fingerprint derivation unit 108 may also be configured to separately derive fingerprints for different portions of media content. For example, an audio/video media content may be separated into separate components (e.g., an audio component and a video component) using a demultiplexer and a fingerprint may be derived separately for each component. A fingerprint derivation unit 108 may be at each processing module within the media content processing unit 104 for fingerprint derivation before or after the processing module. The fingerprint derivation unit 108 may also be centrally located where media content is transmitted to the fingerprint derivation unit 108 from processing points for derivation of a fingerprint.

In a possible embodiment, the fingerprint comparison unit 110 corresponds to hardware and/or software for comparing fingerprints derived from two or more points along a processing chain from media content A 102 to media content B 106. For example, the fingerprint comparison unit 110 may be configured to compare a fingerprint derived from media content A 102 with a fingerprint derived from media content B 106, as shown in FIG. 1. The fingerprint comparison unit 110 may also be configured to compare any other fingerprints along the processing chain from media content A 102 to media content B 106. In an example, the fingerprints may include a set of 1's and 0's, in which the fingerprint comparison unit 110 may compare the fingerprints and determine which bits are different and which are matching.

The fingerprint comparison unit 110 may determine whether a media content is derived from another media content based on a similarity between the fingerprints of the respective media contents. For example, if a predetermined number of matching digits (or other characters, numbers, symbols, etc. used in the fingerprint) are found between the fingerprints, then the respective media contents may be determined to be related (e.g., a first media content was processed to generate the second media content). Other techniques may also be used to determine whether a media content is derived from another media content (e.g., file naming conventions, timestamps, etc.).

Based on the number of matching digits (or other characters, numbers, symbols, etc. used in the fingerprint), the fingerprint comparison unit 110 may determine a quality degradation between the media content corresponding to the compared fingerprints. For example, if 8 out 10 fingerprint bits of media content A 102 match the fingerprint bits of media content B 106, where each bit is weighted equally at ten percent, then the fingerprint comparison unit may determine an eighty-percent degree of similarity or conversely, a twenty-percent quality degradation. In other embodiments, each bit may be weighted differently. For example, certain bits that are unlikely to flip with processing may be classified as strong bits and bits that are more likely to flip with processing may be classified as weak bits. The percentage strength assigned to each bit to determine a degree of similarity or a quality degradation may be proportional to the strength of the bit.

Figure 4:
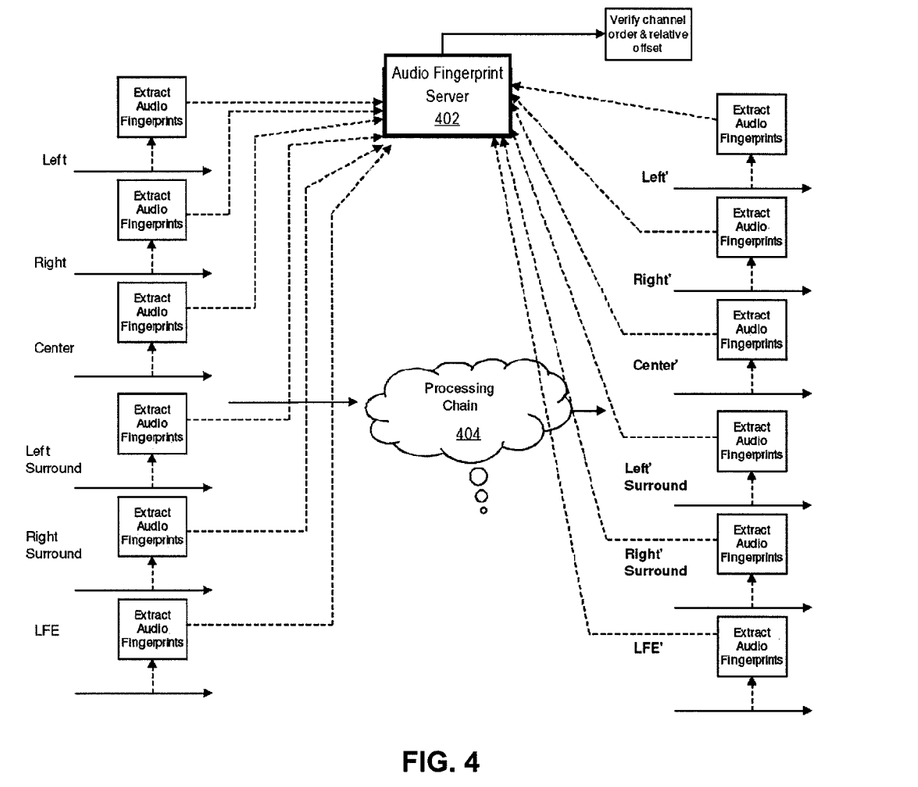
FIG. 4 depicts an example, according to an embodiment of the present invention.

In an embodiment, the fingerprint comparison unit 110 may compare sequences of bits (or other characters, numbers, symbols, etc. that make up the fingerprint) to determine a reordering of groups of bits. For example, the fingerprint comparison unit 110 may determine that two groups of bits in a first fingerprint are interchanged or shifted in a second fingerprint. Based on the interchanged groups, the fingerprint comparison unit 110 may determine errors. Examples of errors identified by the fingerprint comparison unit 110 with comparison of fingerprints include, but are not limited to, a media channel reordering, a media content sequence reordering, or a difference between a relative alignment of components in the first media content and relative alignment of corresponding components in the second media content. The difference in relative alignment may further be used to identify a difference in spatial effects or in a improper alignment of metadata (e.g., closed caption) associated with media content. Metadata may also include quality related information about a corresponding media content. For example, metadata may be modified at each quality assurance point to record the quality of the media content at that quality assurance point. As illustrated in FIG. 4, media content may be separated by channel and a fingerprint may be derived for each portion separately or a portion of a combined fingerprint corresponding to each channel may be determined for two points along a processing chain of media content and stored in a fingerprint server. Thereafter each group of signature bits that corresponds to different channels may be verified by group for order and relative offset. The difference in relative offset may be used to identify an exchange in channel information for the media content as a result of the processing in the processing chain. Accordingly, the fingerprint comparison unit 110 may be configured to detect media content similarity, media content quality degradation, the above specified errors, or other differences between media content at points along the processing chain based on a comparison of fingerprints of the corresponding media content.

In an embodiment, the processing correction unit 112 corresponds to hardware and/or software configured to provide corrective action to the media content processing unit 104 based on the quality degradation identified by the fingerprint comparison unit 110. For example, the processing correction unit 112 may remove, replace, or correct one or more processing modules that result in a quality degradation from media content A 102 to media content B 106. The processing correction unit 112 may also include functionality to retrieve or recover one or more portions of media content that are missing (e.g., data packets, a media content channel, a portion of a clip, etc.). The processing correction unit 112 may be connected to an interface such that the correction options may be selected by a user. The processing correction unit 112 may also be completely automated such that the least time consuming or least costly correction option is selected. For example, when a channel switching error is detected, the media content processing unit 104 may be provided corrective action that replace the erroneous processing module with a backup processing module. The processing correction unit 112 may also provide instructions for the correction of the erroneous processing module that results in correction of the channel switching error. In an embodiment, a different module besides the erroneous module may used to counter the error. For example, if an erroneous processing module switches two channels, the subsequent processing module may be configured to switch the two channels back resulting in the original configuration.

In an embodiment, the processing correction unit 112 may be activated if a predetermined quality degradation threshold is met. For example, the quality degradation detected may be quantified using a predefined metric or assigned a numerical value proportional to the amount of quality degradation. Thereafter, the quality degradation may be compared to a predetermined quality degradation threshold. If the quality degradation meets or exceeds the quality degradation threshold then the corrective action may be taken. If the quality degradation is not met, then the corrective action is not taken and the quality degradation is still deemed satisfactory. The quality degradation threshold may be static, defined by a user, or dynamic based on one or more factors. For example, the quality degradation threshold may be based on a hamming distance between the media content fingerprints being tested. In this example, the larger the hamming distance between the media content two fingerprints being compared the larger the quality degradation threshold because the larger the hamming distance, the greater the amount of quality degradation is expected.

3.0 Example Flow Diagram

Figure 2:
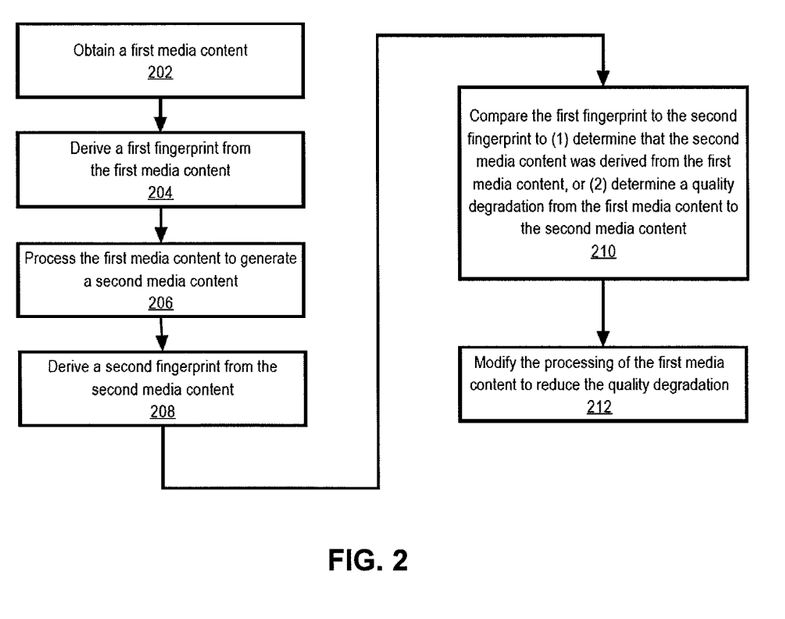
FIG. 2 depicts an example method for determining a quality degradation between media content at different points in a processing chain, according to an embodiment of the present invention.

FIG. 2 illustrates one example method for determining a quality degradation between media content at different points in a processing chain. One or more steps illustrated in FIG. 2 may be modified, rearranged, or omitted all together.

In this example, initially a first media content is obtained (Step 202). In an embodiment, the first media content may be received from a program, a process, or a user. The first media content may correspond to content immediately subsequent to production, or may be obtained from an intermediate point within a processing chain. The first media content may be verified for quality using an automated means or manual inspection (e.g., watching or listening by a user).

Next a first fingerprint is derived from the first media content (Step 204). The fingerprint may be derived using any methods known in the art. The first fingerprint may be classified as a master fingerprint if the quality of the first media content has been verified or if the first media content is obtained directly from the producer (who may have verified the quality). The first fingerprint may be used for comparison to any fingerprints taken downstream along a processing chain. As described above, the first fingerprint may correspond to the entire media content, or a portion of the media content (e.g., audio portion or video portion).

Next, the first media content is processed to generate a second media content (Step 206). In an example where the media content processing unit 104 involves multiple processing modules, the processing modules may be serially applied to the first media content to generate the second media content. The processing modules may also be applied in parallel to the first media content. For example, an audio processing module may be applied to an audio portion of the first media content, while a video processing module may be applied to a video portion of the first media content. Parallel processing may reveal further insight in the quality measured at certain points along the processing chain and may lead to improved quality monitoring (e.g. in terms of synchronization between audio and video).

In an embodiment, a second fingerprint is derived from the second media content (Step 208). The second fingerprint may be derived in any manner as described above in Step 204. In an embodiment, many different fingerprints may be derived along a processing chain and stored in a fingerprint server. The master fingerprint or the earliest derived fingerprint may be identified using a timestamp or another suitable mechanism.

Thereafter, the first fingerprint and the second fingerprint may be compared to determine one or more of: (1) a similarity between the fingerprints that indicates that that the second media content was derived from the first media content, or (2) a difference between the fingerprints and a quality degradation from the first media content to the second media content, in accordance with an embodiment (Step 210). The comparison between the first fingerprint and the second fingerprint may involve a simple comparison of bits of the two fingerprints to determine matching bits and different bits. The comparison may also involve a more sophisticated comparison to identify interchanged or translated groups of bits between the two fingerprints to detect errors as described above. When more than two fingerprints are compared, a trend or pattern in the difference may be identified. For example, the quality degradation at each point in comparison to the immediately previous point in the processing chain or in comparison to another point (e.g., an initial point in the processing chain verified for quality control by a user corresponding to a master fingerprint) may be analyzed to determine trends in the quality degradation. For example, a quality degradation at each of a first set of processing modules may be a consistent acceptable percentage. However, after a certain point along the processing chain the quality degradation may start to increase at an exponential rate. The point where the rate of change in the quality degradation significantly increases may be identified based on the trend and the one or more processing modules that initiate the exponential quality degradation may be identified. Quality degradation may also be determined using other media content quality metrics. Examples of media content quality metrics include Signal to Noise Ratio (SNR), Peak Signal to Noise Ratio (PSNR), Perceptual Evaluation of Video Quality (PEVQ), Structural Similarity (SSIM), Czenakowski Distance (CZD), Universal Quality Index (UQI), Video Quality Metric (VQM), audio frequency response, Total Harmonic Distortion (THD), channel separation, stereo phase correlation, effective rms power, loudness, weighted power, sample magnitude, true-peak, sample bit-depth, sample endianness, audio data burst spacing, etc.

As described above, a processing module that causes a quality degradation may be identified with comparing fingerprints of media content before and after the processing module. However, in cases where quality degradation is detected at the end of a large processing chain with a large number of processing modules, an algorithm for quicker detection of the erroneous processing module may be used. For example, if quality degradation is detected somewhere between a $1^{st}$ processing module and a $50^{th}$ processing module, then, the fingerprint derivation unit 108 may first obtain fingerprints before and after a middle point (e.g., a $25^{th}$ processing module) to determine if the quality degradation has occurred. If the quality degradation has occurred already, then the fingerprint derivation unit 108 may derive fingerprints before and after a processing module between the $1^{st}$ processing module and the $25^{th}$ processing module. If the quality degradation has not yet occurred, then the fingerprint derivation unit 108 may derive fingerprints before and after a processing module between the $25^{th}$ processing module and the $50^{th}$ processing module. The fingerprint derivation unit 108 may continue to recursively select processing modules in the manner described above and until the processing module causing the quality degradation is identified. The process may also be repeated to identify additional processing modules that cause a quality degradation. In addition to quality degradation, a fingerprint may also be used to verify whether or not a media asset has successfully passed through a system in its entirety (e.g., from frame and/or sample zero to the end of the asset). The term "successfully" may be defined as each frame of video and/or audio has being verified with a single or multiple analysis points/nodes. In another application, playlist verifications may be performed based on a media content fingerprint. For example, the fingerprints of audio/video files played out according to a playlist may be compared with the fingerprints expected to be played out according to a playlist. This allows verification of the mapping of song/video titles from the playlist to the actual content file.

In cases, where a quality degradation is identified, the processing chain may be modified to reduce the quality degradation (Step 212). In a possible embodiment, an erroneous processing module causing the quality degradation may simply be replaced with a backup processing module. The erroneous processing module may also be corrected or removed. In a possible embodiment, another processing module may be used to counteract the quality degradation. The identification of quality degradation could be used to adaptively trigger an internal or external quality correction process and/or action. If at a certain processing module or node a quality degradation is identified, a notification message could be sent to a different processing module that corrects the quality degradation. For example, if at a certain node many frame drops are identified, an error correction scheme could be applied to the audio/video stream that mitigates the effects of frame loss. Further, dropped frames, dropped channels, missing clips within the content, or any other missing portion of the media content may be recovered, retrieved from a previous version, etc. Multimedia streams could also be rerouted over a different network path if a current path is detected as congested. This could be achieved with a Multi Protocol Label Switching (MPLS) expansion, or MPLS reroute mechanism in case an MPLS network is used. Similarly, in a generic IP network rerouting over a different network path could be achieved with changing the weights assigned in an Open Shortest Path First (OSPF) protocols. Also, notification messages may be given highest priority in a Diffserv framework. In an embodiment, back up processing modules may be used to when an erroneous processing module is detected as described below in relation to FIG. 3A-FIG. 3B.

4.0 Example System Diagram

Figure 3A:
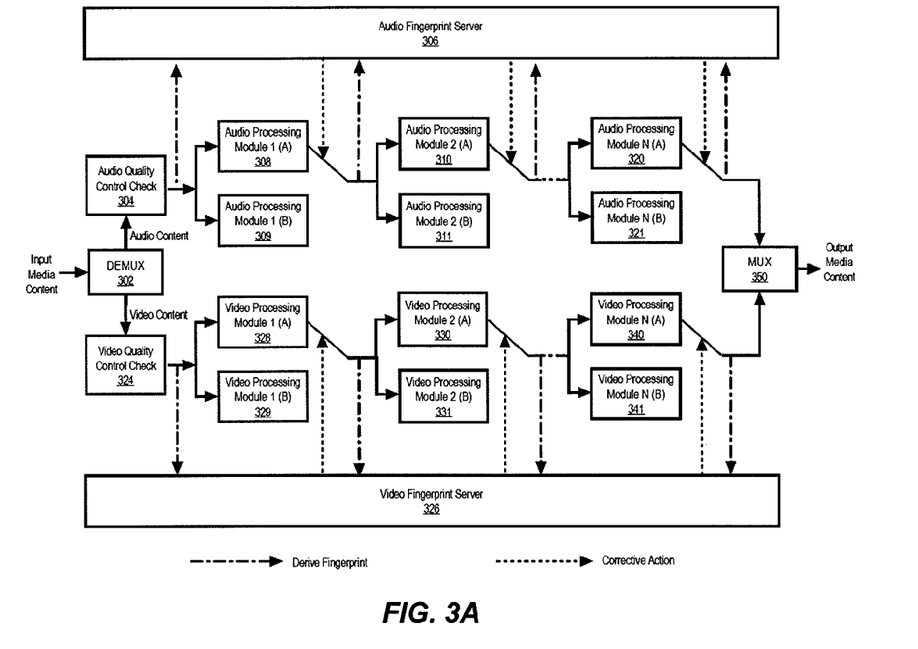
FIG. 3A-FIG. 3B depict an example of a system using fingerprint comparison to detect quality degradation and corrective action to reduce quality degradation, according to embodiments of the present invention.
Figure 3B:
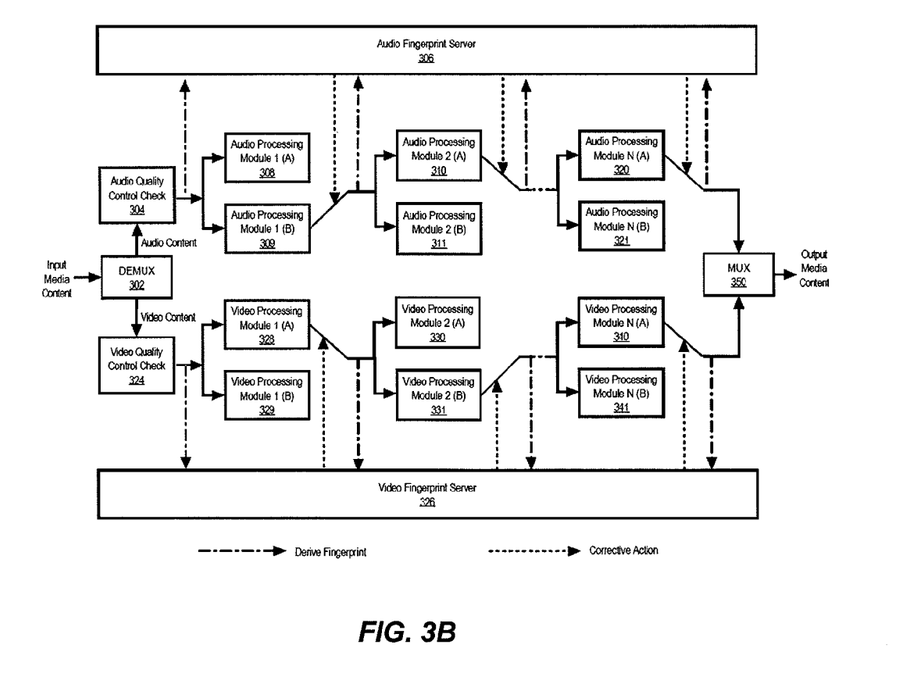

FIG. 3A-FIG. 3B show an example of a system using fingerprint comparison to detect quality degradation and corrective action to reduce quality degradation in accordance with in an embodiment.

Within the example system, there may be N different processing modules arranged serially for audio processing and M different video processing modules arranged serially for video processing. In such an architecture, the quality of audio/video may be checked after each processing block or after a portion of the processing blocks. Content identification using fingerprinting can enable automatic verification of the quality and may obviate the need for manual quality check after each processing block. At the front-end of the broadcast processing or content production chain, the quality of the audio portion of the input and the video portion of the input may be checked, verified or validated to ensure a quality control metric is met.

In a possible embodiment, the fingerprints of the original audio/video are derived and stored in respective fingerprint servers (which may also be implemented as a single server). After each processing block, fingerprints are extracted again from processed audio/video and sent to the fingerprint servers. The fingerprint server may return the time stamp of the matching fingerprint from an original audio/video fingerprint database. Thus, content and fingerprints may be identified in association with audio/video processing points based on the timestamp. Once the identification is completed, the quality of processed media content may be compared to previous media content from previous processing points or to the original media content received. In this example, audio processing module 1 (A) and video processing module 2 (A) were found to be erroneous resulting in quality degradation. Accordingly, as illustrated in the processing chains of FIG. 3B, audio processing module 1 (A) is replaced with audio processing module 1 (B) and video processing module 2 (A) is replaced with video processing module 2 (B). Thereby, the quality degradation is reduced.

5.0 Implementation Mechanisms

Figure 5:
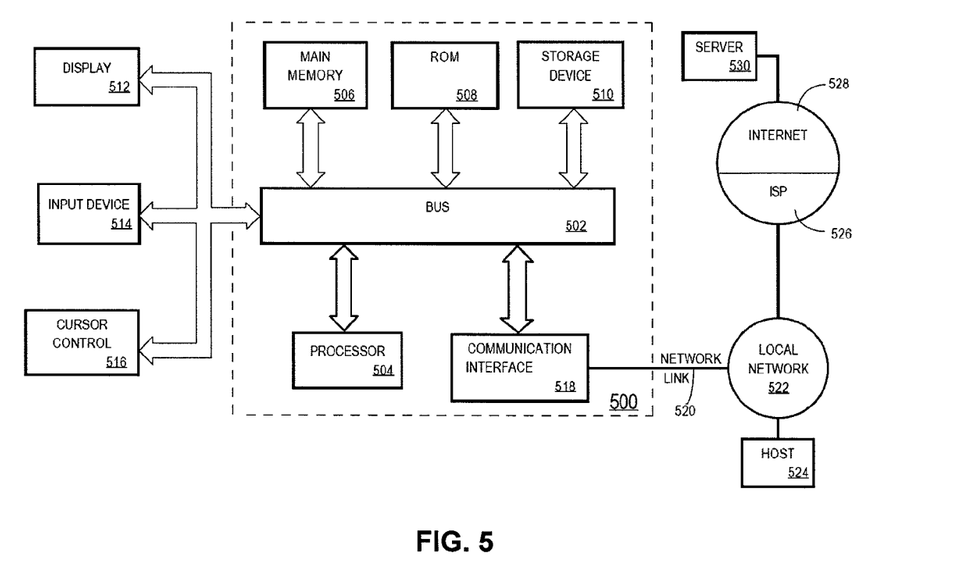
FIG. 5 depicts a block diagram that illustrates a computer system upon which an embodiment of the present invention may be implemented.

FIG. 5 depicts a block diagram that illustrates a computer system 500 upon which an embodiment of the present invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), liquid crystal display (LCD), plasma screen display, or the like, for displaying information to a computer user. An input device 514, including alphanumeric (or non-alphabet based writing systems and/or non-Arabic number based) and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), which allows the device to specify positions in a plane.

Embodiments may relate to the use of computer system 500 for implementing techniques described herein. According to an embodiment of the invention, such techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any storage medium that participates in providing data that causes a machine to operation in a specific fashion. In an embodiment implemented using computer system 500, various machine-readable media are involved, for example, in providing instructions to processor 504 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or electromagnetic waves, such as those generated during radio-wave and infrared and other optical data communications. Such media are tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, other legacy media, or any other physical medium with patterns of holes or darkened spots, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a digital subscriber line (DSL) or cable modem (traditionally modulator/demodulator) to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as the received code is received, and/or stored in storage device 510, or other non-volatile storage for later execution. In this manner, computer system 500 may obtain application code in the form of a carrier wave.

Figure 6:
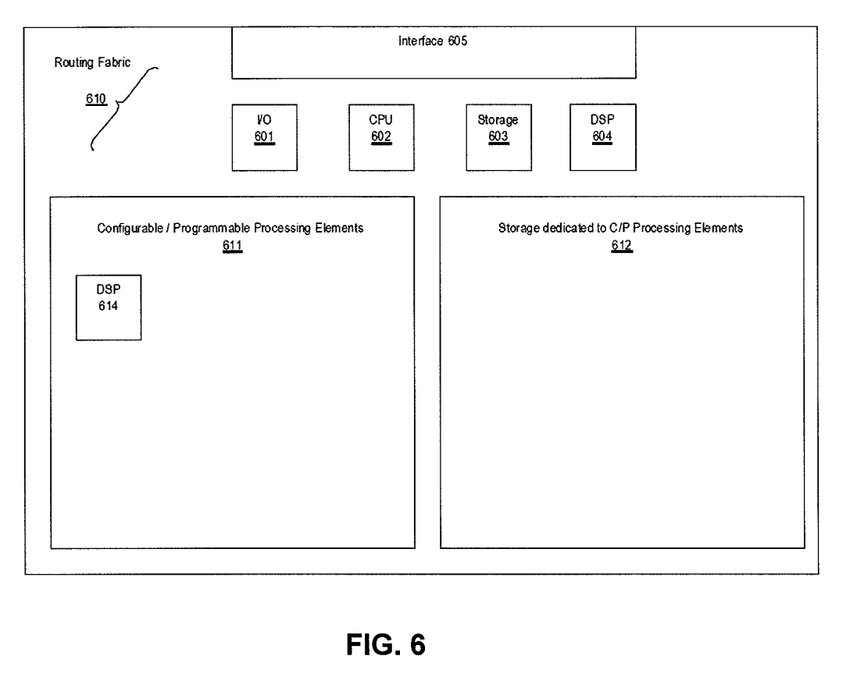
FIG. 6 depicts an example IC device, according to an embodiment of the present invention.

FIG. 6 depicts an example IC device 600, with which a possible embodiment of the present invention may be implemented. IC device 600 may have an input/output (I/O) feature 601. I/O feature 601 receives input signals and routes them via routing fabric 610 to a central processing unit (CPU) 602, which functions with storage 603. I/O feature 601 also receives output signals from other component features of IC device 600 and may control a part of the signal flow over routing fabric 610. A digital signal processing (DSP) feature performs at least a function relating to digital signal processing. An interface 605 accesses external signals and routes them to I/O feature 601, and allows IC device 600 to export signals. Routing fabric 610 routes signals and power between the various component features of IC device 600.

Configurable and/or programmable processing elements (CPPE) 611, such as arrays of logic gates may perform dedicated functions of IC device 600, which in an embodiment may relate to deriving and processing media fingerprints that generally correspond to media content. Storage 612 dedicates sufficient memory cells for CPPE 611 to function efficiently. CPPE may include one or more dedicated DSP features 614.

An embodiment of the present invention may relate to one or more of the example embodiments enumerated below.

The invention claimed is:
1. A method, comprising the steps of:
obtaining a first fingerprint derived from and uniquely identified with a first media content, wherein the first media content is processed to generate a second media content;
obtaining a second fingerprint derived from and uniquely identified with the second media content;
comparing the first fingerprint and the second fingerprint to determine a difference between the first fingerprint and the second fingerprint; and
determining, based on the difference between the first fingerprint and the second fingerprint, whether a quality degradation exists between the first media content and the second media content;
wherein the comparing step comprises identifying groups of bits that are interchanged or shifted between the first fingerprint and the second fingerprint.

2. The method as recited in claim 1, wherein the comparing the first fingerprint and the second fingerprint further determines a similarity between the first fingerprint and the second fingerprint that indicates that the second media content is generated from the first media content.

3. The method as recited in claim 1, wherein the quality degradation between the first media content and the second media content is proportional to a number of differing bits between the first fingerprint and the second fingerprint.

4. The method as recited in claim 1, further comprising the step of:
   modifying the processing of the first media content to reduce the quality degradation from the first media content to the second media content.

5. The method as recited in claim 1, further comprising the steps of:
   comparing the quality degradation to a quality degradation threshold; and
   modifying the processing of the first media content to reduce the quality degradation from the first media content to the second media content if the quality degradation threshold is met.

6. The method as recited in claim 5, wherein the quality degradation threshold is based on one or more of:
   a hamming distance from the first fingerprint to the second fingerprint;
   a signal to noise ratio (SNR);
   a peak signal to noise ratio (PSNR);
   a perceptual evaluation of video quality (PEVQ);
   a structural similarity (SSIM) between the first media content and the second media content;
   a universal quality index (UQI);
   a video quality metric (VQM);
   an audio frequency response;
   a total harmonic distortion (THD);
   a channel separation;
   a stereo phase correlation;
   an effective root mean square (RMS) power;
   a loudness;
   a weighted power;
   a sample magnitude;
   a true-peak;
   a sample bit-depth;
   a sample endianness; or
   an audio data burst spacing.

7. The method as recited in claim 1, wherein the first media content is processed to generate the second media content with applying a plurality of processing modules to the first media content.

8. The method as recited in claim 7, further comprising the steps of:
   identifying a processing module of the plurality of processing modules that caused the quality degradation from the first media content to the second media content.

9. The method as recited in claim 8, further comprising one or more of the steps of:
   removing the processing module that caused the quality degradation from the first media content to the second media content to reduce the quality degradation;
   replacing the processing module that caused the quality degradation from the first media content to the second media content with a back-up processing module to reduce the quality degradation; or
   correcting the processing module that caused the quality degradation from the first media content to the second media content to reduce the quality degradation.

10. The method as recited in claim 1, wherein the quality degradation comprises one or more of:
    at least a portion of the first media content missing in the second media content;
    a media channel reordering;
    a media content sequence reordering; or
    a difference between a relative alignment of components in the first media content and a relative alignment of corresponding components in the second media content.

11. The method as recited in claim 10, wherein the difference between the relative alignment of components in the first media content and the relative alignment of corresponding components in the second media content results in a difference in spatial effect created with a plurality of channels in the first media content and a spatial effect created with a corresponding plurality of channels in the second media content.

12. The method as recited in claim 1, further comprising the steps of verifying a quality of the first media content prior to deriving the first fingerprint from the first media content.

13. The method as recited in claim 1, wherein an airtime associated with a broadcast of the second media content is verified based on the second fingerprint that is derived from the second media content.

14. The method as recited in claim 1, wherein the step of obtaining the first fingerprint derived from the first media content comprises the steps of:
    obtaining a first audio fingerprint from an audio portion of the first media content and a first video fingerprint from a corresponding video portion of the first media content in parallel prior to processing the first media content; and
    determining an alignment of the audio portion of the first media content relative to the video portion of the first media content;
    wherein the step of obtaining the second fingerprint derived from the second media content comprises:
       obtaining a second audio fingerprint from an audio portion of the second media content and a second video fingerprint from a corresponding video portion of the first media content in parallel subsequent to processing the first media content; and
    wherein determining a difference between the first fingerprint and the second fingerprint comprises:
       verifying an alignment of the audio portion of the second media content relative to the video portion of the second media content based on the alignment of the audio portion of the first media content relative to the video portion of the second media content.

15. The method as recited in claim 1, wherein the comparing step comprises the step of determining one or more errors, the one or more errors comprising one or more of:
    a media channel reordering;
    a media content sequence reordering; or
    a difference between a relative alignment of components in the first media content and a relative alignment of corresponding components in the second media content.

16. The method as recited in claim 1, wherein:
    the first and second media content each comprises a plurality of channels;
    each group of bits in the first fingerprint corresponds to one of the channels in the first media content; and
    each group of bits in the second fingerprint corresponds to one of the channels in the second media content.

17. The method as recited in claim 16, wherein the comparing step comprises:
    verifying each group of bits for order and relative offset; and
    using a difference in relative offset to identify an exchange in channel information for the media content as a result of processing the media content in a processing chain.

18. The method as recited in claim 1, wherein more than two fingerprints are compared, and a trend or pattern in the difference is identified.

19. The method as recited in claim 1, wherein the media content is processed in a processing chain having a plurality of quality measurement points, and further comprising the steps of:

analyzing the quality degradation at each point in comparison to the immediately previous point in the processing chain or any other point in the processing chain to determine a trend in the quality degradation; and identifying a point where the rate of change in the quality degradation significantly increases.

20. The method as recited in claim 19, wherein the point at which the rate of change in the quality degradation significantly increases is a point at which the quality degradation starts to increase at an exponential rate, and further comprising:

identifying one or more processing modules that cause the exponential quality degradation.

21. The method as recited in claim 20, further comprising the step of:

recursively selecting processing modules until the one or more processing modules that cause the exponential quality degradation are identified.

22. A computer readable storage medium product having encoded instructions which, when executed by one or more processors, cause or control the one or more processors to perform the steps of a process, the process steps comprising:

obtaining a first fingerprint derived from and uniquely identified with a first media content, wherein the first media content is processed to generate a second media content;

obtaining a second fingerprint derived from and uniquely identified with the second media content;

comparing the first fingerprint and the second fingerprint to determine a difference between the first fingerprint and the second fingerprint; and determining, based on the difference between the first fingerprint and the second fingerprint, whether a quality degradation exists between the first media content and the second media content;

wherein the comparing step comprises identifying groups of bits that are interchanged or shifted between the first fingerprint and the second fingerprint.

23. A system, comprising:

a processor;

a fingerprint derivation unit comprising functionality for:

obtaining a first fingerprint derived from and uniquely identified with a first media content, wherein the first media content is processed to generate a second media content; and obtaining a second fingerprint derived from and uniquely identified with the second media content; and a fingerprint comparison unit comprising functionality for comparing the first fingerprint and the second fingerprint to determine a difference between the first fingerprint and the second fingerprint and for determining, based on the difference between the first fingerprint and the second fingerprint, whether a quality degradation exists between the first media content and the second media content;

wherein the functionality for comparing comprises functionality for identifying groups of bits that are interchanged or shifted between the first fingerprint and the second fingerprint.

24. A computer readable storage medium product having encoded instructions which, when executed by one or more processors, cause or control the one or more processors to configure, control or program a system, the system comprising:

a processor;

a fingerprint derivation unit comprising functionality for:

obtaining a first fingerprint derived from and uniquely identified with a first media content, wherein the first media content is processed to generate a second media content; and obtaining a second fingerprint derived from and uniquely identified with the second media content; and a fingerprint comparison unit comprising functionality for comparing the first fingerprint and the second fingerprint to determine a difference between the first fingerprint and the second fingerprint and for determining, based on the difference between the first fingerprint and the second fingerprint, whether a quality degradation exists between the first media content and the second media content;

wherein the functionality for comparing comprises functionality for identifying groups of bits that are interchanged or shifted between the first fingerprint and the second fingerprint.

25. A computer system, comprising:

means for obtaining a first fingerprint derived from and uniquely identified with a first media content, wherein the first media content is processed to generate a second media content;

means for obtaining a second fingerprint derived from and uniquely identified with the second media content;

means for comparing the first fingerprint and the second fingerprint to determine a difference between the first fingerprint and the second fingerprint; and means for determining, based on the difference between the first fingerprint and the second fingerprint, whether a quality degradation exists between the first media content and the second media content;

wherein the means for comparing comprises means for identifying groups of bits that are interchanged or shifted between the first fingerprint and the second fingerprint.

26. The system as recited in claim 25, wherein the means for comparing the first fingerprint and the second fingerprint further comprises means for determining a similarity between the first fingerprint and the second fingerprint that indicates that the second media content is generated from the first media content.

* * * * *